United States Patent
Phillips et al.

(10) Patent No.: US 8,346,638 B2
(45) Date of Patent: Jan. 1, 2013

(54) SYSTEMS AND METHODS FOR PROCESSING TRANSACTION DATA TO PERFORM A MERCHANT CHARGEBACK

(75) Inventors: Stephen F. Phillips, Richmond, VA (US); Craig M. Chumney, Mechanicsville, VA (US)

(73) Assignee: Capital One Financial Corporation, McLean, VA (US)

( * ) Notice: Subject to any disclaimer, the term of this patent is extended or adjusted under 35 U.S.C. 154(b) by 610 days.

(21) Appl. No.: 11/258,216

(22) Filed: Oct. 26, 2005

(65) Prior Publication Data

US 2007/0094137 A1    Apr. 26, 2007

(51) Int. Cl.
 *G06Q 40/00* (2012.01)
(52) U.S. Cl. .......................................... 705/35
(58) Field of Classification Search .............. 705/35, 705/40–45
See application file for complete search history.

(56) References Cited

U.S. PATENT DOCUMENTS

| | | | | |
|---|---|---|---|---|
| 5,991,733 | A * | 11/1999 | Aleia et al. | 705/8 |
| 6,032,134 | A * | 2/2000 | Weissman | 705/40 |
| 6,783,065 | B2 * | 8/2004 | Spitz et al. | 235/380 |
| 6,999,943 | B1 * | 2/2006 | Johnson et al. | 705/39 |
| 7,082,417 | B1 * | 7/2006 | Marry et al. | 705/402 |
| 7,251,624 | B1 * | 7/2007 | Lee et al. | 705/35 |
| 7,264,506 | B2 * | 9/2007 | Mori et al. | 439/606 |
| 7,403,922 | B1 * | 7/2008 | Lewis et al. | 705/38 |
| 7,617,146 | B2 * | 11/2009 | Keaton et al. | 705/37 |
| 7,644,035 | B1 * | 1/2010 | Biffle et al. | 705/39 |
| 2002/0095360 | A1 * | 7/2002 | Joao | 705/30 |
| 2002/0128960 | A1 * | 9/2002 | Lambiotte et al. | 705/38 |
| 2002/0139837 | A1 * | 10/2002 | Spitz et al. | 235/375 |
| 2002/0194119 | A1 * | 12/2002 | Wright et al. | 705/38 |
| 2003/0144866 | A1 * | 7/2003 | Pagliari et al. | 705/1 |
| 2003/0174823 | A1 | 9/2003 | Justice et al. | |
| 2003/0187783 | A1 * | 10/2003 | Arthus et al. | 705/39 |
| 2004/0030644 | A1 | 2/2004 | Shaper | |
| 2004/0199462 | A1 | 10/2004 | Starrs | |
| 2005/0015332 | A1 * | 1/2005 | Chen | 705/39 |
| 2005/0021462 | A1 * | 1/2005 | Teague et al. | 705/40 |
| 2005/0178824 | A1 * | 8/2005 | Benson et al. | 235/380 |
| 2005/0234820 | A1 * | 10/2005 | MacKouse | 705/40 |
| 2006/0149671 | A1 * | 7/2006 | Nix et al. | 705/40 |
| 2007/0073615 | A1 * | 3/2007 | Marchesi | 705/39 |

(Continued)

FOREIGN PATENT DOCUMENTS

WO    WO 2004/084113 A1    9/2004

OTHER PUBLICATIONS

Blake, J. (1994). ConsumptionProfile costing: An enhancement to activty based costing. The Journal of Bank Cost & Management Accounting, 7(1), 5-5.*

(Continued)

*Primary Examiner* — Bruce I Ebersman
(74) *Attorney, Agent, or Firm* — Finnegan, Henderson, Farabow, Garrett & Dunner, LLC

(57) ABSTRACT

Systems and methods consistent with the present invention may be used as part of determining whether to chargeback a purchase transaction amount to a merchant. To this end, the system may heuristically analyze purchase transaction data to determine which transactions to analyze for chargeback processing. For instance, the system may identify purchase transactions that are likely to qualify for a chargeback. For the identified purchase transactions, the system may then determine an expected value for each transaction in terms of received revenue from chargeback processing and the costs for performing a chargeback. Using the expected values for this transaction data, the system may then prioritize which purchase transactions to review for chargeback to a respective merchant.

26 Claims, 3 Drawing Sheets

U.S. PATENT DOCUMENTS

2007/0094137 A1* 4/2007 Phillips et al. .................. 705/40
2007/0106582 A1* 5/2007 Baker et al. ..................... 705/35
2009/0204524 A1* 8/2009 McGeorge ...................... 705/35

OTHER PUBLICATIONS

Survey of retail payment loss and credit risk. (1992). Chain Store Age Executive with Shopping Center Age, 68(12), 1-1B.*

Poor recordkeeping leads to losses, suggests fraud expert. (1999). Credit Risk Management Report, 9(11), 1-5.*

Lucas, Peter, "Tech Tolls Unplugged: A new wave of software applications is helping creditors and collectors work more efficiently and produce better results," Business & Company Resource Center—News/Magazine Display Page, http://galenet.galegroup.com/servlet/BCRC?vrsn=147&locID=nysl_me_, Visited Aug. 9, 2005, pp. 1-6.

* cited by examiner

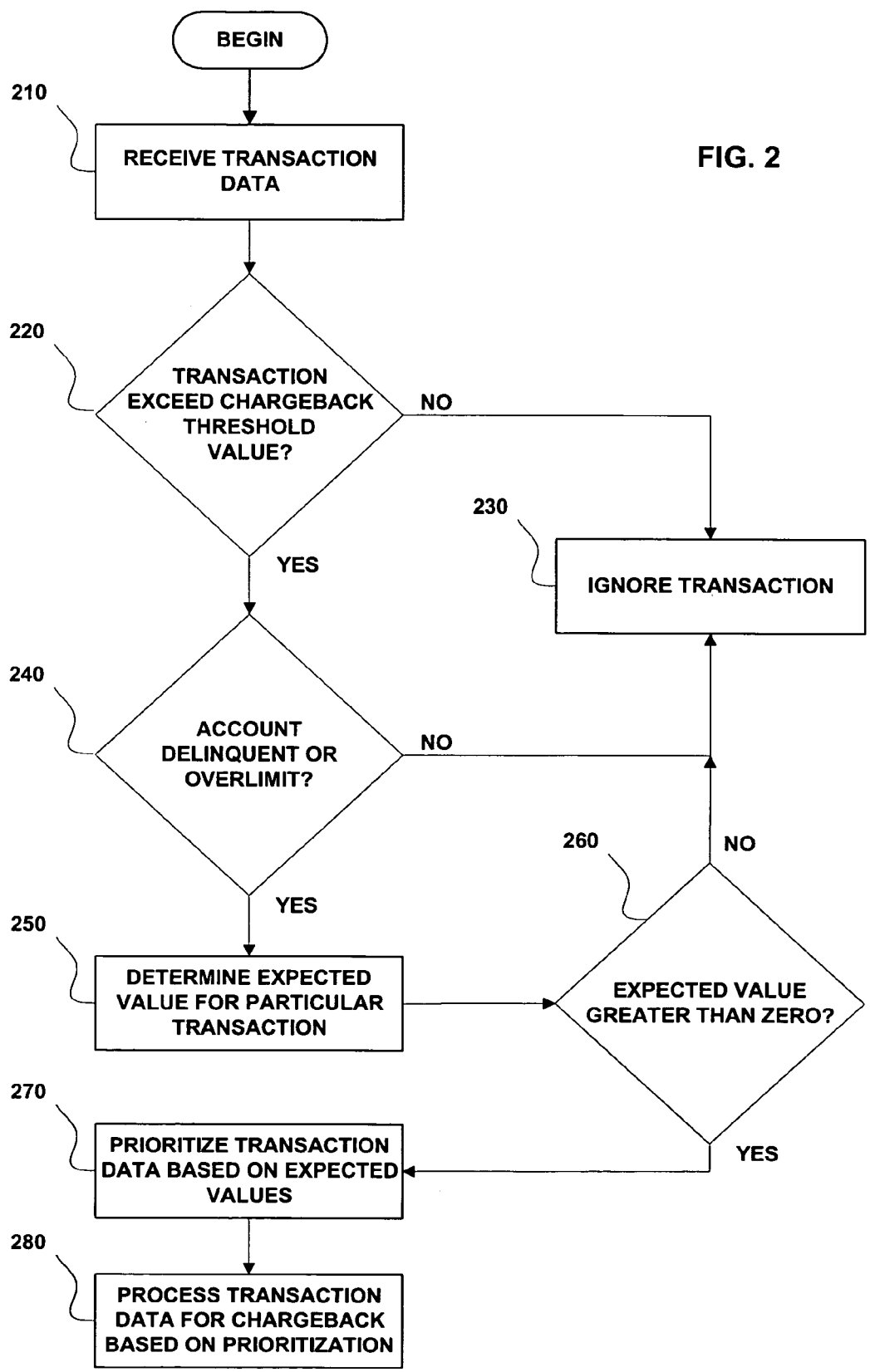

Expected Value Matrix 300

| MasterCard/Visa | Mastercard | | | | | | | | Visa | | | | | | | |
|---|---|---|---|---|---|---|---|---|---|---|---|---|---|---|---|---|
| Collections Status | Delinquent | | | | Over Limit | Delinquent and Over Limit | | | Not Delinquent or Over Limit | | | Delinquent | | | | |
| Days Late | <30 | 30-59 | 60-89 | | <30 | 60-89 | | | <30 | | <30 | 60-89 | | | 90-119 | |
| Transaction Type | Travel & Entertainment | Service Station (Paid at Pump) | Service Station (Paid Inside) | Mail-Order/Telephone Order | Service Station (Paid at Pump) | Mail-Order/Telephone Order | Travel & Entertainment | Food | Food | Travel & Entertainment | Pay @Pump | Mail-Order/Telephone Order | Travel & Entertainment | Service Station (Paid at Pump) | Mail-Order/Telephone Order |
| Transaction Amount | | | | | | | | | | | | | | | | |
| $0-25 | | | | | | | | | $0.01 | | | | | | | |
| $25-50 | | | $0.10 | $25.50 | | $7.21 | | $0.31 | $0.09 | | $0.31 | $1.24 | | | | $2.24 |
| $50-75 | $0.75 | $0.80 | $1.11 | $21.80 | $0.33 | $11.73 | | $0.90 | $0.44 | | $0.90 | $10.61 | | $0.75 | $13.41 |
| $75-250 | $1.50 | | | $23.18 | | $21.15 | $2.24 | $1.15 | | $1.24 | $1.15 | | $11.73 | $0.80 | |
| $250-500 | $1.75 | | | $27.11 | | $30.11 | $15.61 | | | $1.61 | | $25.12 | $21.15 | | $31.20 |
| >$500 | $2.00 | | | | | | $45.12 | | | | | | | | | |

FIG. 3

SYSTEMS AND METHODS FOR PROCESSING TRANSACTION DATA TO PERFORM A MERCHANT CHARGEBACK

TECHNICAL FIELD

Embodiments consistent with the present invention generally relate to managing data associated with a purchase transaction made between a customer and a merchant by using a financial account, such as a credit account. More particularly, systems and methods consistent with the invention manage transaction data as part of determining whether to chargeback a particular purchase transaction to a merchant.

BACKGROUND

Credit issuing businesses and other financial institutions often have difficulty with the non-payment of debt, such as credit card debt. In some cases, a financial institution does not receive payment because the customer is unable to afford payment. In other cases, a customer may intentionally not pay because the customer believes a purchase transaction that was made using the customer's account was fraudulent. In either case, the non-payment of debt may cost a financial institution millions of dollars a year in revenue.

Instead of seeking recovery of the debt from the consumer, the financial institution may be able to recover a payment for a purchase transaction from a merchant associated with that transaction. Requiring the merchant to pay for the purchase transaction may stem from certain obligations the merchant may be under in accepting a customer's financial account device (e.g., a credit card) as payment for the transaction. For instance, when accepting a customer's credit card as payment, the merchant is typically obligated to verify the customer's signature, confirm the account is not expired, and obtain authorization from the financial institution that issued the credit card. Such obligations are typically part of an agreement the merchant may have with a credit card organization, such as MasterCard™ or Visa™, and/or the financial institution that issued the credit card. If the merchant does not comply with these obligations and the customer does not pay, then the merchant may be responsible for paying the transaction amount—even though the financial institution (e.g., the credit card issuer) already paid the merchant on behalf of the customer for the purchase transaction. The act of recovering payment from the merchant is referred to as a "chargeback." That is, the financial institution charges back the merchant for the amount of the purchase transaction. Further, in some cases, the chargeback may be done via the merchant's bank (e.g., the financial may charge the merchant's bank for the purchase transaction and the bank will then recover payment from the merchant).

Most financial institutions will thus attempt to chargeback the merchant in appropriate circumstances. However, determining whether a purchase transaction can be charged back to merchant is typically time consuming. A problem may thus occur when the cost of determining whether the transaction can be charged back exceeds the amount of any payment recovered. Indeed, a financial institution may spend substantial time determining whether a particular transaction can be charged back, only to learn that it cannot. Accordingly, a financial institution may incur substantial costs in processing transactions for chargeback or even incur a loss if the money spent processing such transactions exceeds any payments actually charged back to merchants.

Currently, financial institutions do not consider the cost of performing a merchant chargeback analysis, or the probability that an particular transaction will actually be charged back, when determining whether to chargeback a transaction. For example, a financial institution may simply analyze all accounts to determine whether any unpaid transactions on those accounts may be charged back to a merchant. The financial institution may thus review each transaction to determine whether the merchant followed the procedures it was obligated to perform (e.g., obtaining the customer's signature) in completing the purchase transaction. This way of processing transactions for chargeback is thus costly and inefficient. Indeed, this process typically results in charging back only about 35% of all transactions reviewed. The financial institution has thus reviewed nearly every account, even though only a low percentage of transactions are actually charged back. Accordingly, the financial institution does not effectively reduce its expenses, and thus maximize its profits, in appropriately charging back merchants for purchase transactions.

In view of the foregoing, there is presently a need for an improved system and method for managing purchase transaction data as part of determining whether to chargeback a particular transaction to a merchant. Specifically, there is a need to target only those purchase transactions that are likely to be charged back to a merchant, thereby reducing costs and maximizing profits of the financial institution.

SUMMARY

Consistent with an embodiment of the present invention, a method is provided for managing purchase transaction data as part of determining whether to chargeback a purchase transaction. The method includes receiving transaction data reflecting purchase transactions associated with one or more financial accounts, determining an expected value of each purchase transaction based on charging back the respective purchase transaction to a respective merchant, and prioritizing each purchase transaction according to the determined expected value of each purchase transaction, such that the purchase transactions may be processed for chargeback to a respective merchant in order of priority.

Consistent with another embodiment of the present invention a method is provided for managing purchase transaction data as part of determining whether to chargeback a purchase transaction that comprises receiving transaction data reflecting purchase transactions associated with one or more financial accounts, filtering the received transaction data to select purchase transactions determined to have a likelihood of being charged back to a respective merchant, determining an expected value of each filtered purchase transaction based on charging back the respective purchase transaction to a respective merchant, and prioritizing each purchase transaction according to the determined expected value of each purchase transaction, such that the prioritized purchase transactions may be processed for chargeback to a respective merchant in order of priority.

Consistent with another embodiment of the present invention a system is provided for managing purchase transaction data as part of determining whether to chargeback a purchase transaction. The system comprises a means for receiving transaction data reflecting purchase transactions associated with one or more financial accounts, a means for determining an expected value of each purchase transaction based on charging back the respective purchase transaction to a respective merchant, and a means for prioritizing each purchase transaction according to the determined expected value of each purchase transaction, such that the purchase transactions may be processed for chargeback to a respective merchant in order of priority.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention. In the drawings:

FIG. 2 is an exemplary flowchart of a method, consistent with the present invention, for managing purchase transaction data as part of determining whether to chargeback a purchase transaction; and FIG. 3 is an exemplary matrix that, consistent with the present invention, may be used to process transaction data having expected values for purposes of a chargeback.

DESCRIPTION OF THE EMBODIMENTS

Figure 1:
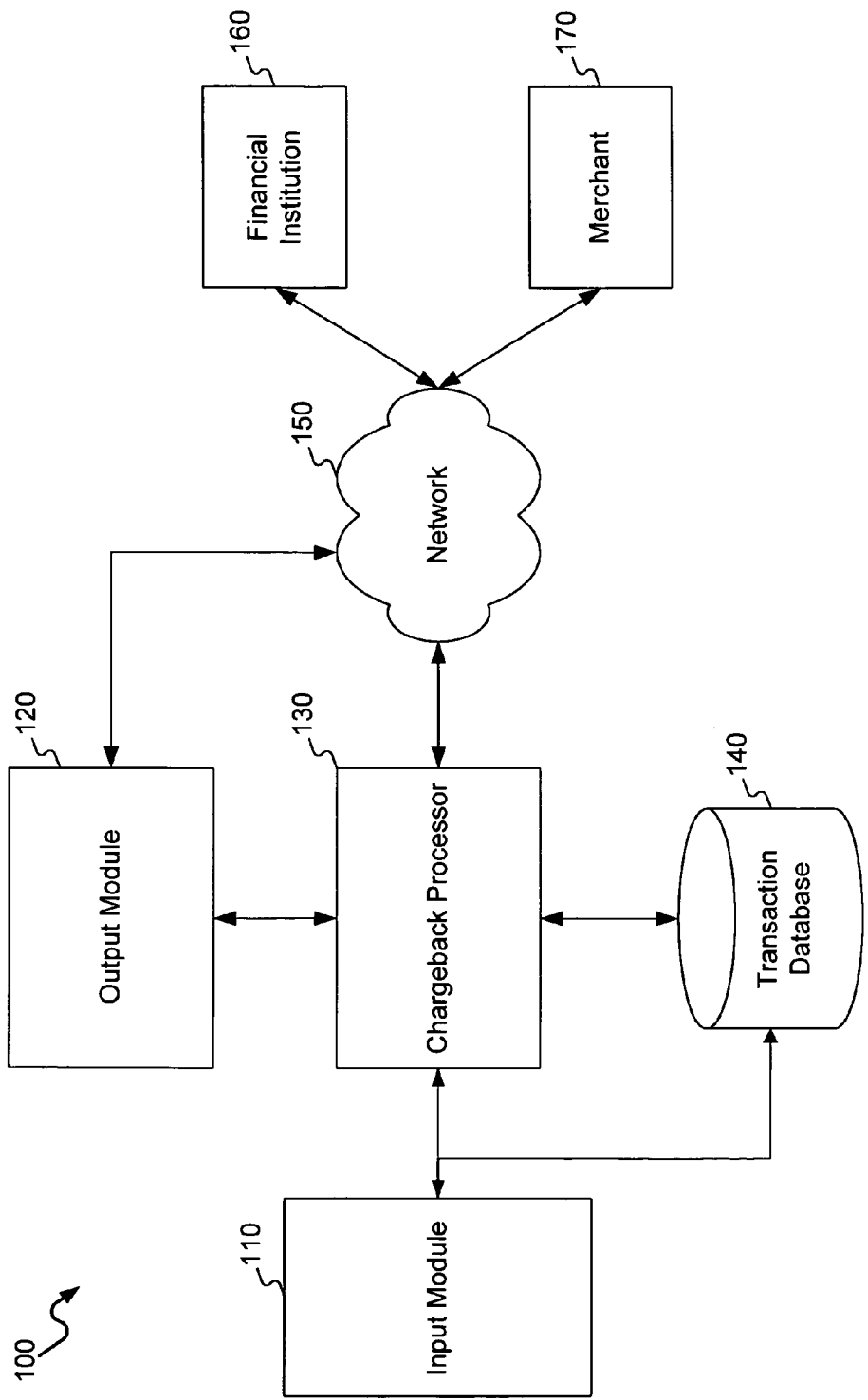
FIG. 1 illustrates an exemplary system environment in which the features of the present invention may be implemented.

Systems and methods consistent with the present invention may be used as part of a chargeback process to determine whether to chargeback a purchase transaction amount to a merchant. To this end, the system may heuristically analyze purchase transaction data to determine which transactions to analyze for chargeback processing. As described below, the system may first identify purchase transactions that are likely to qualify for a chargeback. For the identified purchase transactions, the system may then determine an expected value for each transaction in terms of received revenue from chargeback processing and the costs for performing a chargeback. Using the expected values for this transaction data, the system may then prioritize which purchase transactions to review for chargeback to a respective merchant.

Reference will now be made to exemplary embodiments of the invention, examples of which are illustrated in the accompanying drawings. Wherever possible, the same reference numbers will be used throughout the drawings to refer to the same or like parts.

By way of a non-limiting example, FIG. 1 illustrates a transaction management system 100 for implementing embodiments consistent with the present invention. As illustrated in the block diagram of FIG. 1, system 100 may include an input module 110, an output module 120, a chargeback processor 130, and a transaction data database 140. A network 150 may also be provided to facilitate communication with a financial institution 160 and a merchant 170. While the various components of system 100 may be owned and/or operated by a credit account issuer (e.g., financial institution 160), these components may, of course, be owned and/or operated by any number of entities for the benefit of the credit issuer and account holders.

Input module 110 may be implemented using a wide variety of devices to receive and/or provide data as input to chargeback processor 130. For instance, input module 110 may include an input device (e.g., a keyboard, mouse, disk drive or other suitable input device), a storage device (e.g., a disk drive, optical drive, CD-ROM, or other device for storing information), and/or a network interface to receive data over a network (such as a LAN, WAN, intranet or the Internet) and to provide the same as input to chargeback processor 130 or to transaction data database 140. Input module 110 may be used to enter or obtain transaction data for determining whether a purchase transaction may be charged back to a merchant. Input module 110 may thus forward the received transaction data to chargeback processor 130 for processing and/or to transaction data database 140 for storage.

Output module 120 may include a display, a printer device, and/or a network interface (each not shown in FIG. 1) for receiving the results provided as output from chargeback processor 130. These results may include, for example, a file including a prioritized list of purchase transactions to be reviewed for charging back the transaction amount to a respective merchant. The output from chargeback processor 130 may be displayed or viewed, for example, through the display (such as a CRT or LCD) and printer device of module 120. If needed, the network interface of module 120 may communicate the results from chargeback processor 130 over a network (such as a LAN, WAN, intranet or the Internet) to remote or distant locations for further chargeback processing. For example, output module 120 may output processed transaction data to financial institution 160 and/or to merchant 170 for use in processing transactions for chargeback.

Chargeback processor 130 provides the necessary functionality and computing capabilities for managing purchase transaction data for chargeback processing. For instance, chargeback processor 130 may identify which purchase transaction data received from input module 110 or stored in transaction database 140 should be reviewed for determining whether a chargeback is warranted. In this regard, chargeback processor 130 may determine expected values for identified transaction data and prioritize that transaction data based on the determined expected values. Chargeback processor 130 may then provide the prioritized transaction data to output module 120.

Chargeback processor 130 may comprise any personal computer, workstation, or mainframe computer for performing various functions and operations consistent with embodiments of the invention. Chargeback processor 130 may be implemented, for example, by a general purpose computer selectively activated or reconfigured by a computer program stored in a computer, or may be a specially constructed computing platform for carrying out the features and operations of the present invention. Chargeback processor 130 may also be implemented or provided with a wide variety of components or subsystems including, for example, one or more of the following: a central processing unit, a co-processor, memory, registers, and other data processing devices and subsystems.

Further, chargeback processor 130 may communicate or transfer transaction data to and from input module 110 and output module 120 through the use of direct connections or other types of communication links, as illustrated in FIG. 1. For instance, processor 130 may communicate with modules 110, 120 through the use of a network architecture similar to that of network 150. Processor 130 may output the results of analyzed transaction data to output module 120, which may print or display the results, or output the results to other system devices, such as database 140, financial institution 160, or merchant 170.

Transaction database 140 may store customer account records. Each customer account record may include purchase transaction data reflecting one or more purchase transactions made using the account with a particular merchant. The transaction data may thus identify an account type (e.g., Visa or MasterCard), a particular merchant, and a transaction amount. Further, the transaction data of database 140 may also include information identifying a transaction type associated with a particular purchase transaction. For example, each merchant may be associated with a particular merchant type or category, such as "travel and entertainment," "food," "service station," etc. This merchant type data may thus be used to identify a particular transaction type for each purchase transaction (e.g., that the purchase transaction was one for "travel and entertainment," "food," or "gas"). In exemplary embodiments, transaction types and/or merchant types may be defined by a credit card organization, such as MasterCard or Visa. In addition, the transaction data may also include information about the status of each account associated with a particular purchase transaction, such as whether the account is delinquent (and how many days delinquent), whether the account is over limit (and how much over limit), and/or the collection status of any payment due on the account.

Network 150 may comprise, alone or in any suitable combination, a telephony-based network (such as a PBX or POTS), a local area network (LAN), a wide area network (WAN), a dedicated intranet, and/or the Internet. Further, network 150 may comprise any suitable combination of wired and/or wireless components and systems. By using dedicated communication links or a shared network architecture, computing platform 130 may be located in the same location or at a geographically distant location from modules 110, 120, financial institution 160, and/or merchant 170.

Financial institution 160 may be the entity that issued a customer's financial account associated with the purchase transaction data processed by system 100. In exemplary embodiments, the financial account is a credit account. However, systems consistent with the invention may be used to process other types of accounts. Merchant 170 represents a merchant with whom a customer may have made a purchase transaction. As shown in FIG. 1, chargeback processor 130 and/or output module 120 may communicate with merchant 170 via network 150. For example, merchant 170 may receive communications regarding a particular purchase transaction that financial institution 160 may chargeback to the merchant. Further, while FIG. 1 shows only one merchant, systems consistent with the present invention may communicate any number of merchants.

FIG. 2 illustrates an exemplary flow diagram, consistent with the present invention, for determining whether to process a purchase transaction for chargeback to a merchant. As described below, by using the process of FIG. 2, system 100 may identify which transaction data to review for possible chargeback to a merchant, and may prioritize the identified transaction data for performing the chargeback review process.

Referring to FIG. 2, system 100 may initially receive all transaction data for chargeback analysis (stage 210). In exemplary embodiments, the received transaction data may be stored in database 140. Further, as described above, the transaction data processed by system 100 may reflect one or more purchase transactions between a respective customer and merchant. As described above, and as known in the art, the data associated with a particular purchase transaction may identify a particular financial account, customer, merchant, transaction amount, transaction date, and other status information associated with the financial account (e.g., whether the customer is delinquent in paying an amount due to the account issuer, whether an amount due exceeds an available credit limit, etc.)

System 100 may then identify which transactions exceed a chargeback threshold value (stage 220). The chargeback threshold value may, for example, define a particular transaction amount (e.g., dollar amount). In exemplary embodiments, this transaction amount may correspond to an amount specified in a merchant-creditor agreement, such as the MasterCard or Visa agreements, which defines transaction amounts that may be subject to chargeback processing. For the MasterCard and Visa agreements, the chargeback threshold value is sometimes referred to as a chargeback floor limit and may vary for different types of merchants. For a transaction amount below a corresponding chargeback threshold value (e.g., $5), the merchant may not be required to obtain the customer's authorization and thus may not be subject to a chargeback for that transaction by the financial institution.

System 100 may also use different chargeback threshold values to analyze purchase transactions associated with different merchants. In such an embodiment, chargeback processor 130 may determine the appropriate chargeback threshold value for a particular purchase transaction based on the merchant or merchant type associated with that transaction. If the transaction data does not exceed the chargeback threshold value (stage 220, "No"), then that particular transaction data is ignored (stage 230) and thus not further processed for a possible chargeback to the merchant. Otherwise (stage 220, "Yes"), processing proceeds to stage 240.

More particularly, for transaction data that does exceed a chargeback threshold value, system 100 may further determine whether the transaction data is associated with an account that falls into a high risk category. As described herein, transactions associated with a high risk account are more likely to be eligible for chargeback to a merchant. For instance, as shown in the exemplary embodiment of FIG. 2, chargeback processor 130 may determine whether the account associated with the transaction data output by processing stage 220 is delinquent or over limit (stage 240). An account may be considered "delinquent" if the customer is overdue in making a required payment. In an exemplary embodiment, an account may be designated delinquent if a customer's required payment is overdue for a certain period of time, such as 30 days. An account may be considered over limit, on the other hand, if the outstanding balance due on the account exceeds a predetermined credit limit associated with the account. In an exemplary embodiment, an account may be designated over limit if the customer's outstanding balance is more than 50% above the actual credit limit.

Accordingly, transaction data associated with a delinquent or over limit account is more likely to be charged back to a merchant. For instance, as noted above, an account may be charged back if the merchant failed to obtain the necessary authorization to complete the purchase transaction using the customer's financial account. Such authorization would have been denied for an account that was delinquent or over limit. Thus, purchase transactions made using a delinquent or over limit financial account indicate a higher probability that the merchant did not seek authorization. Further, transaction data associated with a delinquent or over limit account may also indicate a greater likelihood that the purchase transaction was fraudulent—e.g., the merchant failed to verify that the signature was the customer's. Therefore, chargeback processor 130 identifies the transaction data more likely to be charged back to a merchant by selecting that transaction data that is, for example, associated with a delinquent or over limit financial account.

Referring back to FIG. 2, for transaction data that is not delinquent or over limit (stage 240, "No"), that transaction data is ignored (stage 230) and is thus not further processed for a chargeback. Otherwise (stage 240, "Yes"), processing proceeds to stage 250. In particular, chargeback processor 130 may then, for each purchase transaction of the transaction data output from stages 220 and 240, determine an expected value (stage 250). As described in greater detail below, chargeback processor 130 may determine an expected value of a transaction from the standpoint of charging back the transaction to the merchant.

In systems consistent with the invention, chargeback processor 130 may execute software that determines the expected value of a purchase transaction based on the following exemplary equation (1):

$$\text{Expected Value} = [(EV_{charg\text{-}off}) + (EV_{fee})] \times P_{chargeback} - \text{Costs} \quad (1)$$

where:

"$EV_{charge\text{-}off}$" may reflect the expected value of charging back a purchase transaction, given the probability that the financial institution may otherwise charge-off the associated account and recover payment for the transaction from the customer;

"$EV_{fee}$" may reflect a chargeback fee that the financial institution may obtain from the merchant as a result of a successful chargeback;

"$P_{chargeback}$" may reflect the probability that a particular type of purchase transaction may be charged back; and "Costs" may represent the costs of the financial institution in processing a merchant chargeback.

With regard to the component $EV_{charge\text{-}off}$, as note above, it may reflect an expected value based on the possibility that the financial institution may charge-off the associated financial account and obtain payment from the customer. More specifically, a financial institution may "charge-off" or write-off an account from its accounting books when the account is delinquent to such a degree (e.g., the customer has not made any payment for 6 months) that it is no longer considered an asset because payment from the customer is considered improbable. However, even though a financial institution charges-off an account, it may still be able to recover payment through various types of subsequent collection efforts. Any payment so recovered from the customer typically includes fees for interest on the original transaction amount. Accordingly, because a payment recovered from the customer after charge-off may include interest charges, it may have a greater value to the financial institution than a merchant chargeback, since the merchant would be charged for only the transaction amount and not any interest charges. If customer never pays, on the other hand, then it may be more beneficial to the financial institution to chargeback the transaction to the merchant so that the financial institution can at least recover the original transaction amount.

In systems consistent with the invention, the $EV_{charge\text{-}off}$ component may be calculated by using the following exemplary formula:

$$EV_{charge\text{-}off} = T_{amount} \times P_{charge\text{-}off} \times P_{non\text{-}recovery}$$

where:

$T_{amount}$ represents the amount of the purchase transaction;

$P_{charge\text{-}off}$ represents the probability that the account will be charged-off; and $P_{non\text{-}recovery}$ represents that probability that no payment will be recovered from the customer after charging-off the account.

Thus, from the above equation for $EV_{charge\text{-}off}$, chargeback processor 130 may determine the expected value of charging back a purchase transaction amount ($T_{amount}$) to a merchant, while accounting for any likelihood that the financial institution would otherwise receive a payment from the customer for that purchase transaction. More specifically, chargeback processor 130 may determine $EV_{charge\text{-}off}$ by multiplying the purchase transaction amount ($T_{amount}$) by the probability ($P_{charge\text{-}off}$) that the financial institution will charge-off the account and by the probability ($P_{non\text{-}recovery}$) that the financial institution will not collect any payment from the customer after charging-off the account. Further, the probability ($P_{non\text{-}recovery}$) may also be determined based on the probability ($P_{recovery}$) that the financial institution would recover payment from the customer after charging-off the account, since $P_{non\text{-}recovery} = 1 - P_{recovery}$.

The component $EV_{fee}$ may reflect an expected value of a chargeback fee that the financial institution may obtain from the merchant as a result of a successful chargeback. In exemplary embodiments, this chargeback fee may correspond to a fee specified in a merchant-creditor agreement, such as the MasterCard or Visa agreements, which defines a fee (e.g., $25) that a creditor may charge a merchant who does not comply with certain transaction authorization procedures. Thus, chargeback processor 130 may determine the expected value of this chargeback fee based on the following equation:

$$EV_{fee} = F_{amount} \times P_{fee}$$

where:

$F_{amount}$ represents the amount of the chargeback fee that the financial institution may charge a merchant; and $P_{fee}$ represents the probability that the fee will be successfully charged to the merchant.

Finally, the above expected value equation (1) includes a cost component. The cost component may reflect a financial institution's costs incurred in charging back a purchase transaction amount to a merchant. First, these costs may include the cost ($C_{interest\_lost}$) associated with the interest charges that the financial institution loses by charging back the transaction to the merchant. If the financial institution did not perform a chargeback, the financial institution could continue charging interest to the customer on the amount owed for the purchase transaction. When the financial institution charges back the merchant for the purchase transaction, however, the financial institution can no longer require the customer to pay for the transaction and thus loses any expected revenue associated with the interest charged for that transaction.

Second, the financial institution's costs may include a cost ($C_{notification}$) associated with notifying the customer of the chargeback. In particular, the financial institution may need to notify the customer (e.g., via regular mail, e-mail, telephone, etc.) that the purchase transaction is no longer being charged to the customer's account. To notify the customer in this way, the financial institution may incur costs for preparing and sending the actual notification (e.g., the cost to print and mail the notice) as well as any costs for employing workers or machinery to prepare and send the notice. The costs required to notify the customer is represented by $C_{notification}$.

Third, the financial institution's costs may include a cost ($C_{review}$) associated with a user reviewing a particular purchase transaction identified by system 100 to determine whether the transaction may actually be charged back to the merchant and to thus perform the chargeback process itself. As discussed in more detail below with respect to stage 260, the user may need to review the transaction data associated with a particular purchase transaction identified by system 100, contact the merchant, and complete certain required procedures to perform the chargeback. The work for conducting this review is reflected by the cost $C_{review}$.

From the above discussion, the expected value equation (1) may thus be expressed as follows:

$$E.V. = [(T_{amount} \times P_{charge\text{-}off} \times P_{non\text{-}recovery}) + (F_{amount} \times P_{fee})] \times P_{chargeback} - C_{interest\_lost} - C_{notification} - C_{review}$$

For the transaction data for which chargeback processor 130 determined expected values (e.g., according to equation (1)), system 100 may distribute the transaction data in a multi-dimensional matrix stored in a memory device of system 100. The multi-dimensional matrix may be populated with the expected values and using the various other transaction data criteria for the other parameters of the matrix. For example, the multi-dimensional matrix may distribute the determined expected values for each transaction data along the parameters of: (1) the account type (e.g., whether the account is a Visa or MasterCard account); (2) the transaction type; (3) the transaction amount; (4) the amount of delinquency; (5) the collection status for any amount owed by the customer. In exemplary embodiments, system 100 may store the matrix in transaction database 140.

Chargeback processor 130 may then analyze the matrix to identify any transaction data associated with expected values less than zero. In one embodiment, processor 130 may ignore or remove such identified transaction data from further consideration for chargeback processing (stage 260). Chargeback processor 130 may remove this transaction data because, according to the determined expected values, a financial institution should expect to incur a loss in reviewing this data for chargeback. Accordingly, in the exemplary embodiment, processor 130 may then further process only the transaction data in the matrix that have expected values greater than zero.

FIG. 3 illustrates an exemplary matrix 300 that, consistent with the present invention, may be used to process the determined expected values. As shown in FIG. 3, the matrix 300 may include expected values indexed according to one or more transaction data parameters. The matrix of FIG. 3, for example, may index expected values according to: (1) the account type (e.g., whether the account is a Visa or MasterCard account); (2) the collection status for any amount owed by the customer (e.g., whether the customer is delinquent or over limit); (3) the number of days the customer is delinquent; (4) the transaction type (e.g., whether the purchase transaction related to "travel and entertainment," was for gas purchased at the pump or inside a service station, or was for a mail order or telephone order purchase); and (5) the transaction amount, which as shown in FIG. 3 may be categorized into ranges of transaction amounts. Therefore, exemplary embodiments of the present invention may enable chargeback processor 130 to use exemplary matrix 300 to process particular types of purchase transaction data. For instance, processor 130 may use matrix 300 to select MasterCard transactions that are mail-order or telephone-order type of transactions, such that only these may be further processed by system 100.

Accordingly, after determining the expected values, processor 130 may prioritize each purchase transaction data (or those purchase transactions selected using matrix 300, for example) having an expected value greater than zero based on each transaction's expected value (stage 270). According to such a prioritization, transaction data having a higher expected value would be given a higher priority than transaction data having a lower expected value in performing a chargeback process.

Chargeback processor 130 or a user may process or review the prioritized transaction data for chargeback processing in order of the priority given to each purchase transaction (stage 280). For example, a user may initially review the purchase transaction most likely to result in a merchant chargeback (i.e., those having the highest priority). As part of this review, the user may consider records or documentation not included within transaction data stored in database 140, or may contact the merchant 170, to determine whether the merchant failed to comply with certain obligations that may warrant a chargeback. If a determination is made that a chargeback is warranted, then system 100 may charge merchant 170 for the particular transaction amount and make adjustments to the customer's account as necessary. By managing transaction data for chargeback processing in this way, system 100 may target only those purchase transactions that are likely to be charged back to a merchant, and thereby substantially reduce costs and maximize profits of the financial institution. In other embodiments, a software program may be executed in chargeback processor 130 that analyzes the prioritized purchase transactions to determine whether a chargeback is warranted. The software program may generate a notification to another software program configured to initialize chargeback operations consistent with certain embodiments disclosed herein.

Systems consistent with the present invention overcome the shortcomings of conventional systems for determining whether to chargeback a purchase transaction to a merchant. By prioritizing transaction data in the way described herein, systems and methods consistent with the present invention minimize the expense incurred during any chargeback process. Applications for the present invention include merchant chargeback for financial credit accounts, such as credit card accounts. However, other embodiments of the invention will be apparent to those skilled in the art from consideration of the specification and practice of the invention disclosed herein. For example, while the above describes charging back a merchant for purchase transaction, the financial institution may chargeback the merchant via the merchant's bank (e.g., the financial institution charges the merchant's bank for the purchase transaction and the bank then debits the merchant's account with the bank). It is intended that the specification and examples be considered as exemplary only, with the true scope and spirit of the invention being indicated by the following claims.

The foregoing descriptions have thus been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. Again, the scope of the invention is defined by the claims and their equivalents.

What is claimed is:

1. A method for managing purchase transaction data as part of determining whether to chargeback a purchase transaction, comprising:
   receiving transaction data reflecting purchase transactions associated with one or more financial accounts;
   determining, by a computer system, an expected value of each purchase transaction as if a respective purchase transaction is charged-back to a respective merchant when the respective purchase transaction is associated with a financial account categorized as a high risk financial account having an outstanding balance due over a predetermined limit value, wherein the expected value is based on at least one value component comprising at least a fee value component, a probability of chargeback, and a cost incurred in processing a chargeback including, at least, a cost associated with an interest charge that is lost by charging back the respective purchase transaction to the respective merchant;

indexing the expected value of each purchase transaction into a multi-dimensional matrix according to transaction data parameters of each purchase transaction, wherein determining the expected value further comprises determining the fee value component that may be recovered from the respective merchant as a result of charging back the transaction to the respective merchant;

wherein the multi-dimensional matrix comprises a plurality of dimensions each corresponding to one of the transaction data parameters, and wherein the transaction data parameters comprise at least one of an account type, a transaction type, an amount of a respective purchase transaction, an amount of delinquency, and a collection status for any amount owed by a respective customer;

selecting a subset of the purchase transactions represented in the multi-dimensional matrix for chargeback processing using the multi-dimensional matrix;

prioritizing, by the computer system, the subset of the purchase transactions according to the indexed expected values of the subset of the purchase transactions; and processing the subset of the purchase transactions for chargeback to a respective merchant in order of the priority.

2. The method of claim 1, wherein the at least one value component further comprises a chargeback value component, and wherein determining the expected value further comprises determining the chargeback value component that may be charged back to the respective merchant.

3. The method of claim 2, wherein determining the chargeback value component comprises:

weighting an amount of the respective purchase transaction with a probability that an associated account will be charged-off and that no payment will be collected from the respective customer after charging-off the associated account.

4. The method of claim 3, wherein determining the chargeback value component comprises:

weighting the amount of the respective purchase transaction with a probability that the amount may be recovered from the respective customer associated with the financial account.

5. The method of claim 1, wherein determining the fee value component comprises:

weighting a chargeback fee with a probability that the chargeback fee will be successfully charged to the respective merchant.

6. The method of claim 1, wherein determining the expected value further comprises:

subtracting costs incurred in processing a chargeback from the determined expected value.

7. The method of claim 6, wherein the costs reflect a cost associated with notifying the customer of the chargeback.

8. The method of claim 6, wherein the costs reflect a cost associated with a user reviewing the respective purchase transaction to determine whether that purchase transaction may actually be charged back to the respective merchant.

9. The method of claim 1, wherein prioritizing comprises: prioritizing only those purchase transactions that have an expected value that exceeds a predetermined value.

10. The method of claim 1, wherein determining the expected value of each purchase transaction comprises:

determining the expected value for the respective purchase transaction only if the respective purchase transaction exceeds a predetermined transaction amount threshold value.

11. The method of claim 1, wherein a categorized high risk financial account is a delinquent financial account.

12. A non-transitory computer-readable medium storing a program for causing, when executed by a processor, a computer to execute a method for managing purchase transaction data as part of determining whether to chargeback a purchase transaction, the method comprising:

receiving transaction data reflecting purchase transactions associated with one or more financial accounts;

filtering the received transaction data to select a subset of the purchase transactions determined to have a likelihood of being charged back to a respective merchant;

determining an expected value of each filtered purchase transaction in the subset as if a respective purchase transaction is charged-back to a respective merchant when the respective purchase transaction is associated with a financial account categorized as a high risk financial account having an outstanding balance due over a predetermined limit value, wherein the expected value is based on at least one value component comprising at least a fee value component, a probability of chargeback, and a cost incurred in processing a chargeback including, at least, a cost associated with an interest charge that is lost by charging back the respective purchase transaction to the respective merchant;

indexing the expected value of each purchase transaction in the subset into a multi-dimensional matrix according to transaction data parameters of each purchase transaction, wherein determining the expected value further comprises determining the fee value component that may be recovered from the respective merchant as a result of charging back the transaction to the respective merchant;

wherein the multi-dimensional matrix comprises a plurality of dimensions each corresponding to one of the transaction data parameters, and wherein the transaction data parameters comprise at least one of an account type, a transaction type, an amount of a respective purchase transaction, an amount of delinquency, and a collection status for any amount owed by a respective customer;

prioritizing purchase transactions represented in the multi-dimensional matrix according to the indexed expected values of each purchase transactions; and processing the purchase transactions for chargeback to a respective merchant in order of the priority.

13. The method of claim 12, wherein filtering the received transaction data comprises:

ignoring purchase transaction data associated with a transaction amount below a predetermined threshold value.

14. The method of claim 12, wherein filtering the received transaction data comprises:

ignoring purchase transaction data that is not categorized as at least one of delinquent or over limit.

15. A system for managing purchase transaction data as part of determining whether to chargeback a purchase transaction, comprising:

a memory storing instructions; and a processor that executes the instructions to:

receiving transaction data reflecting purchase transactions associated with one or more financial accounts;

determining an expected value of each purchase transaction as if a respective purchase transaction is charged-back to a respective merchant when the respective purchase transaction is associated with a financial account categorized as a high risk financial account having an outstanding balance due over a predetermined limit value, wherein the expected value is based on at least one value component comprising at least a fee value component, a probability of chargeback, and a cost incurred in processing a chargeback including, at least, a cost associated with an interest charge that is lost by charging back the respective purchase transaction to the respective merchant;

indexing the expected value of each purchase transaction into a multi-dimensional matrix according to transaction data parameters of each purchase transaction, wherein determining the expected value further comprises determining the fee value component that may be recovered from the respective merchant as a result of charging back the transaction to the respective merchant;

wherein the multi-dimensional matrix comprises a plurality of dimensions each corresponding to one of the transaction data parameters, and wherein the transaction data parameters comprise at least one of an account type, a transaction type, an amount of a respective purchase transaction, an amount of delinquency, and a collection status for any amount owed by a respective customer;

selecting a subset of the purchase transactions represented in the multi-dimensional matrix for chargeback processing using the multi-dimensional matrix;

prioritizing the subset of the purchase transactions according to the indexed expected values of the subset of the purchase transactions; and processing the subset of the purchase transactions for chargeback to a respective merchant in order of the priority.

16. The system of claim 15, wherein the at least one value component further comprises a chargeback value component, and wherein determining the expected value comprises:
determining an expected value of each purchase transaction based on the chargeback value component that may be charged back to the respective merchant.

17. The system of claim 16, wherein determining the expected value comprises:
weighting an amount of the respective purchase transaction with a probability that an associated account will be charged-off and that no payment will be collected from the customer after charging-off the associated account.

18. The system of claim 17, wherein determining the expected value comprises:
weighting the amount of the respective purchase transaction with a probability that the amount may be recovered from the respective customer associated with the financial account.

19. The system of claim 15, wherein determining the fee value component comprises:
weighting a chargeback fee with a probability that the chargeback fee will be successfully charged to the respective merchant.

20. The system of claim 15, wherein determining the expected value comprises:
subtracting costs incurred in processing a chargeback from the determined expected value.

21. The system of claim 20, wherein the costs reflect a cost associated with notifying the customer of the chargeback.

22. The system of claim 20, wherein the costs reflect a cost associated with a user reviewing the respective purchase transaction to determine whether that purchase transaction may actually be charged back to the respective merchant.

23. The system of claim 15, wherein prioritizing each purchase transaction comprises:
prioritizing only those purchase transactions that have an expected value that exceeds a predetermined value.

24. The system of claim 15, wherein determining the expected value of each purchase transaction comprises:
determining the expected value for the respective purchase transaction only if the respective purchase transaction exceeds a predetermined transaction amount threshold value.

25. The system of claim 15, wherein a categorized high risk financial account is a delinquent financial account.

26. The system of claim 15, wherein a particular purchase transaction from the subset is charged back to the respective merchant via a bank used by the respective merchant.

* * * * *